United States Patent [19]

Tanner

[11] 4,343,035

[45] Aug. 3, 1982

[54] HEADING REFERENCE SYSTEM

[76] Inventor: Walter E. Tanner, 29 Barney Hill Rd., Wayland, Mass. 01778

[21] Appl. No.: 140,295

[22] Filed: Apr. 14, 1980

[51] Int. Cl.³ .............................................. G06F 15/50
[52] U.S. Cl. .................................... 364/453; 244/175; 364/434; 364/450; 364/457
[58] Field of Search ............... 364/424, 434, 443, 449, 364/450, 453, 457; 340/27 AT; 244/175, 179, 181

[56] References Cited

U.S. PATENT DOCUMENTS

| | | | |
|---|---|---|---|
| 3,281,581 | 10/1966 | Lerman et al. | 364/434 |
| 3,683,378 | 8/1972 | Polhemus | 364/450 X |
| 3,979,090 | 9/1976 | Brickner et al. | 244/175 |
| 4,106,094 | 8/1978 | Land | 364/453 |

Primary Examiner—Jerry Smith
Attorney, Agent, or Firm—Joseph S. Iandiorio

[57] ABSTRACT

An aircraft heading reference system including a rate gyro for sensing the yaw rate $\dot{\psi}$ of the aircraft and producing electrical signals representative thereof; a rate gyro for sensing the pitch rate $\dot{\theta}$ of the aircraft and producing electrical signals representative thereof; an air speed sensor for sensing air speed $v$ of the aircraft and producing electrical signals representative thereof; a roll angle computer circuit responsive to the electrical signals representative of the yaw rate, pitch rate, and air speed for determining an electrical signal representative of the roll angle $\phi$ according to the expression:

$$\dot{\psi} + \dot{\theta} \tan \phi = (\tan \phi / \cos \phi) \cdot (g/v)$$

and a yaw and pitch computer circuit, responsive to the pitch rate $\dot{\theta}$, yaw rate $\dot{\psi}$, and roll angle $\phi$ electrical signals for resolving the yaw and pitch rates about the roll angle $\phi$ to provide an electrical signal representative of the heading rate of the aircraft.

11 Claims, 9 Drawing Figures

HEADING REFERENCE SYSTEM

FIELD OF INVENTION

This invention relates to an aircraft heading reference system for providing a heading rate using only pitch rate, yaw rate, and roll angle, and more particularly to such a heading system which requires only two single degree of freedom gyros.

BACKGROUND OF INVENTION

Gyroscopic directional reference systems for piloting and automatic flight control usually consist of a gyroscope having two degrees of freedom and a pendulous two-gimbal suspension, or alternatively a set of three single degree of freedom gyros, either on a gimballed platform or strapped down to the air frame. While throughout this specification and claims the term "aircraft" is used to describe the vehicle in which the heading reference system is located, it should be understood that the invention is equally as well applicable to any type of vehicle which changes its heading direction by rolling or banking of its lifting surfaces, for example hydrofoil vehicles, and the term "aircraft" is meant to include such. A single gyroscope having two degrees of freedom is mechanically complicated and is subject to tumbling problems during maneuvers. In contrast, a three-gyroscope arrangement of single degree of freedom gyros is electrically complicated and relatively expensive. Improved reliability through redundancy for the three-gyroscope arrangement using single degree of freedom gyros typically requires three additional gyros, or six gyros altogether, at significant increase in cost and complexity. Typically with such three-gyro arrangements of single degree of freedom gyros, there is required in addition two accelerometers for alignment.

SUMMARY OF INVENTION

It is therefore an object of this invention to provide an improved smaller, simpler, lighter, and less expensive heading reference system for aircraft and other similar vehicles and to provide the heading angle using only the pitch rate, yaw rate, and forward speed of the vehicle.

It is further object of this invention to provide such a system which requires only two single degree of freedom gyros to provide the pitch and yaw rates.

It is a further object of this invention to provide such a system which requires only three single degree of freedom gyros to provide redundancy for improved reliability.

It is a further object of this invention to provide such a system which does not suffer from gyro tumbling maneuvers.

The invention results from the realization that the heading rate of a vehicle may be determined using only the yaw rate, pitch rate, and air speed of the vehicle.

The invention features a heading reference system for aircraft, or other similar vehicles. The system includes means for sensing the yaw rate $\dot{\psi}$, the pitch rate $\dot{\theta}$, and the air speed $v$ of the aircraft or other vehicle and producing electrical signals representative of each of those quantities sensed. There are means responsive to the electrical signals representative of the yaw rate, pitch rate, and air speed for determining an electrical signal representative of the roll angle $\phi$ according to the expression:

$$\dot{\psi} + \dot{\theta}\tan\phi = (\tan\phi/\cos\phi)\cdot(g/v)$$

Finally, there are means responsive to the pitch rate, yaw rate, and roll angle electrical signals for resolving the yaw and pitch rates about the roll angle to provide an electrical signal representative of the heading rate of the aircraft.

In a preferred embodiment, the means for sensing the yaw rate and the means for sensing the pitch rate each include a single degree of freedom rate gyro, or a single degree of freedom rate integrating gyro of the strapped-down type.

The means for determining the roll angle from the yaw rate, pitch rate, and air speed may include a first divider circuit responsive to the acceleration of gravity as the dividend and the air speed as the divisor; and a subtractor circuit for subtracting the pitch rate from the output of the first divider circuit. A second divider circuit responds to the pitch rate as dividend and output from the second divider circuit as divider. An arctan calculator circuit responsive to the second divider circuit output calculates the roll angle using a simplified technique for roll angles of no greater than approximately 20°.

The arctan calculating circuit may include a squaring circuit and a third divider circuit, each responsive to the output from the second divider circuit. The third divider circuit has a divisor input of three. a multiplier circuit responds to the outputs of the squaring circuit and the third divider circuit. A second subtractor circuit subtracts the output of the multiplier circuit from the output of the second divider to obtain the roll angle.

For roll angles up to approximately 57°, the means for determining may include means for determination of the roll angle from the error expression:

$$X = \dot{\psi} + \dot{\theta}\phi\left(1 + \frac{\phi^2}{3}\right) - \frac{g}{v}\left(1 + \frac{5}{6}\phi^2\right).$$

In addition, for roll angles up through 90° the means for determining may include means for determination of the roll angle from the error expression:

$$X = |\dot{\psi}| + \dot{\theta}\tan\phi - (g/v)\cdot(\sin\phi/\cos^2\phi).$$

The means for resolving pitch and yaw rates into hading rate may include a read only memory (ROM) sine table and a ROM cosine table. There is a ROM addressing circuit responsive to the roll angle for reading in the respective values for the roll angle. A first multiplier circuit responds to ROM sine table readout and pitch rate. A second multiplier circuit responds to ROM cosine table readout and the yaw rate. An adder circuit responds to the output of the first and second multiplier circuits to produce the heading rate of the aircraft. A heading rate integrating circuit may be provided to produce the instantaneous heading angle to a display which manifests the heading, such as in a digital or analog form.

DISCLOSURE OF PREFERRED EMBODIMENT

Other objects, features and advantages will occur from the following description of a preferred embodiment and the accompanying drawings, in which.

Figure 1:
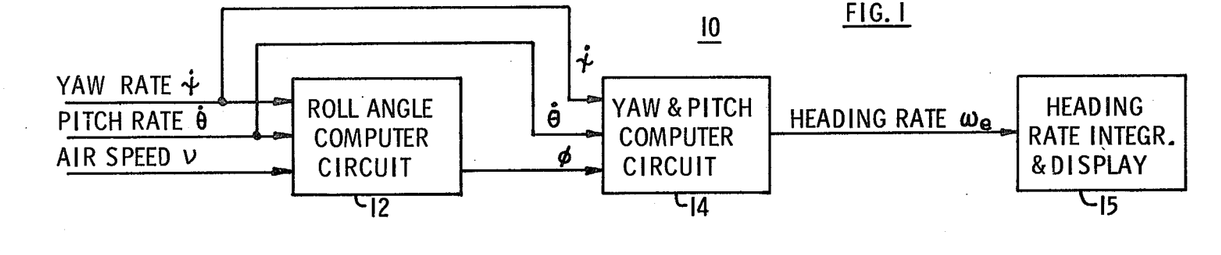
FIG. 1 is a block diagram of a heading reference system according to this invention.

There is shown in FIG. 1 a heading reference system 10 including a roll angle computer circuit 12 and yaw and pitch rate resolver circuit 14. Roll angle computer circuit 12 receives at its input electrical signals representative of the yaw rate $\dot{\psi}$, pitch rate $\dot{\theta}$, and air speed $v$, from which it calculates the roll angle $\phi$. The signals representative of the yaw rate, pitch rate, and roll angle are then submitted to the yaw and pitch rate resolver circuit, which provides an electrical signal representative of the heading rate $\omega_e$ to heading rate integrator display 15, which may include an integrating circuit, see FIG. 6.

Figure 2:
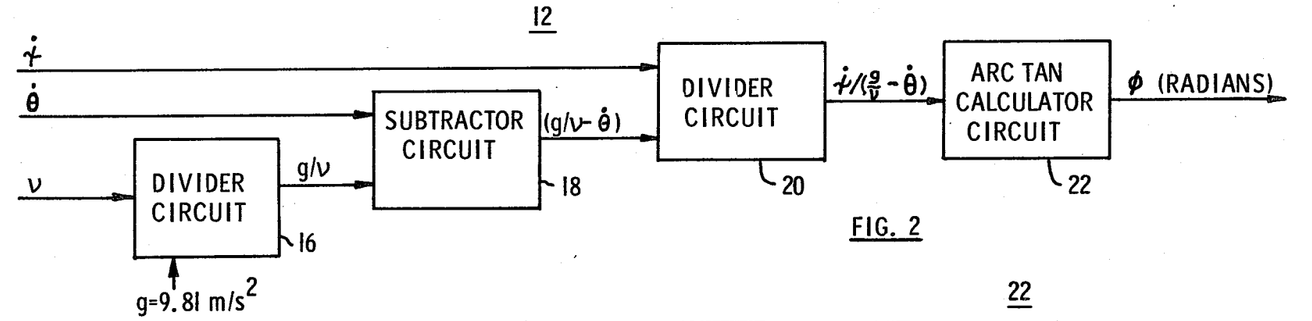
FIG. 2 is a more detailed block diagram of a roll angle computer circuit that may be used in the system of FIG. 1.

Roll angle computer circuit 12 may include, FIG. 2, a divider circuit 16, subtractor circuit 18, divider circuit 20, and arctan calculator circuit 22. Divider circuit 16 receives as its input air speed $v$ and acceleration of gravity g, a constant. The pitch rate $\dot{\theta}$ is subtracted from the output of divider circuit 16 in subtractor circuit 18, whose output in turn is divided into the yaw rate $\dot{\psi}$ in divider circuit 20. The resulting signal, representing the tangent of the roll angle, is submitted to arc-tan calculator circuit 22, which then determines the roll angle, preferably for roll angles of up to approximately 20°.

Figure 3:
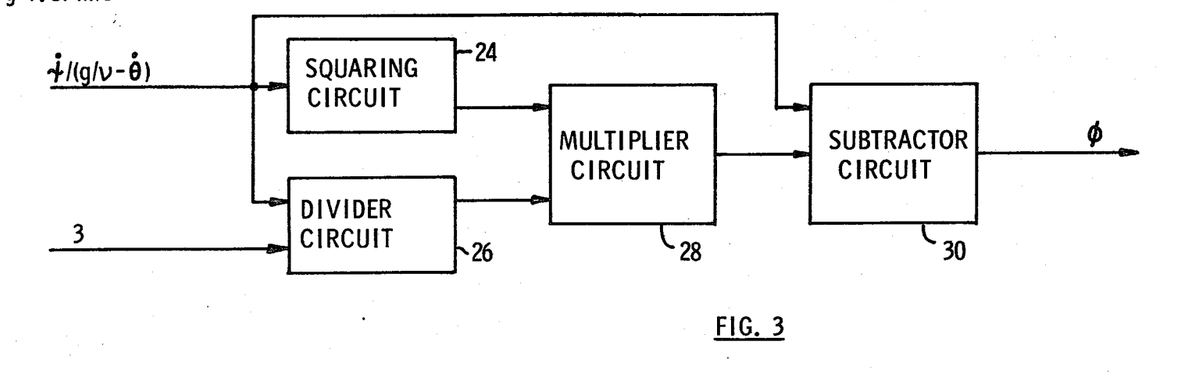
FIG. 3 is a more detailed block diagram of an arctan calculator circuit which may be used in the circuit of FIG. 2.

Arc-tan calculator circuit 22 may include squaring circuit 24, FIG. 3, divider circuit 26, multiplier circuit 28, and subtractor circuit 30.

The output of divider circuit 20 is delivered to squaring circuit 24, divider circuit 26, and subtractor circuit 30. Divider circuit 26 also receives as a divisor the input number three. The output of squaring circuit 24 and divider circuit 26 are multiplied together in multiplier circuit 28, whose output is subtracted from the output from divider circuit 20 in subtractor circuit 30 to provide the roll angle.

That the approach taken in FIGS. 1 and 2 is sound may be seen from the following explanation. For a coordinated turn the heading rate may be expressed:

$$\omega_e = g \tan\phi / v \quad (1)$$

where: $\omega_e$ = heading rate, g = gravitational acceleration, $v$ = velocity within air-mass, and $\phi$ = roll angle.

The heading rate may also be expressed:

$$\omega_e = \dot{\theta}\sin\phi + \dot{\psi}\cos\phi \quad (2)$$

where $\dot{\theta}$ = pitch rate and $\dot{\psi}$ = yaw rate. All angles are expressed relative to the earth's geodetic coordinate grid. The two equations may be combined to produce a transcendental equation for $\phi$:

$$\dot{\psi} + \dot{\theta}\tan(\phi) = (\tan(\phi)/\cos(\phi))(g/v) \quad (3)$$

which can be solved for values of the roll angle from zero to plus or minus 90°.

For values of the roll angle $\phi$ between zero and plus or minus 20°, the cosine term in equation (3) can be neglected, leading to an approximate solution:

$$\tan(\phi) = \frac{\dot{\psi}}{g/v - \dot{\theta}} \quad (4)$$

Alternatively, expression (3) may be written as:

$$\dot{\psi} + \dot{\theta}\tan(\phi) = \frac{g}{v} \frac{\sin\phi}{\cos^2(\phi)} \quad (5)$$

The trigonometric functions may be replaced by truncated power series to produce an error equation:

$$X = \dot{\psi} + \dot{\theta}\phi\left(1 + \frac{\phi^2}{3}\right) - \frac{g}{v}\phi\left(1 + \frac{5\phi^2}{6}\right) \quad (6)$$

Figure 4:
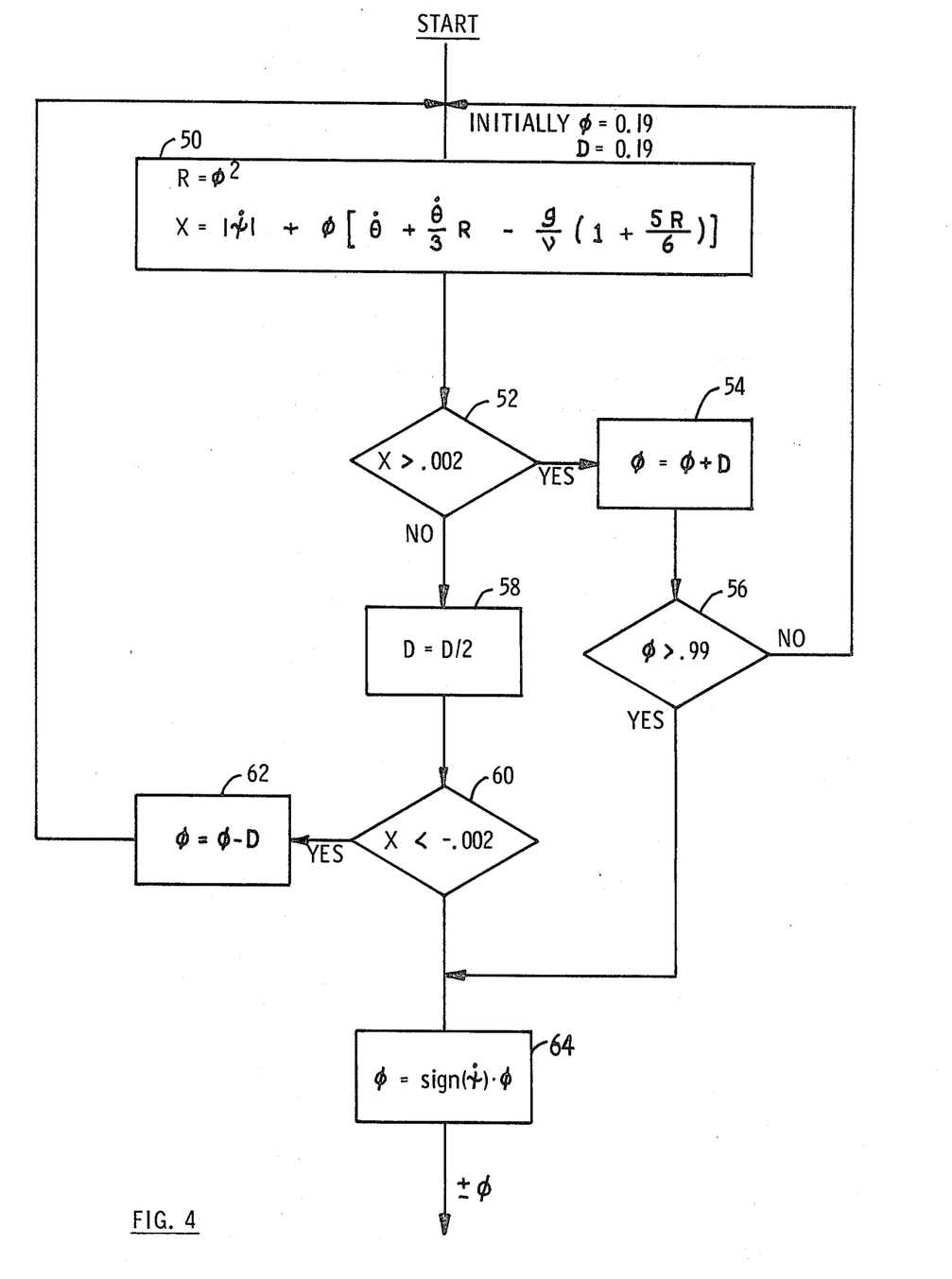
FIG. 4 is a diagram of a procedure which may be implemented in a microprocessor in the roll angle computer circuit of FIG. 1.

This error expression may then be used to obtain the roll angle in roll angle computer circuit 12, for example by using a microprocessor chip such as a Zilog or Mostek Z-80 microprocessor with a ROM set to operate as shown in FIG. 4.

Initially, roll angle $\phi$ is assumed to 0.19 radians, the equivalent of approximately 11°, the quantity D is also assumed to be 0.19 radians, and R = $\phi^2$. The error equation (6) is solved, step 50. Next the error X is reviewed to see whether or not it is larger than some preselected error limit, for example 0.002, step 52. If the error is larger, $\phi$ is incremented by the amount D, step 54; that is, it is in effect doubled from 0.19 to 0.38 radians or 22°. An inquiry is made as to whether $\phi$ is larger than 0.99, step 56. If it is not, the system is moved back to the input and the error is again calculated in step 50. When finally the error X in step 52 is found to be not larger than the selected value 0.002, D is changed to D/2, step 58; that is, D is no longer equal to 0.19 radians, but rather to 0.095 radians or 5.5°. X is now compared, step 60, to a small negative quantity, −0.002. If X is smaller, e.g. a larger absolute number in the negative direction, new $\phi$ is created by subtracting from the old $\phi$ the value D, step 62, as calculated in step 58. This is looped back to the input and the error X is computed again in step 50. When finally it is determined in step 60 that the error X is not smaller than −0.002, that is that the error is between −0.002 and +0.002, the system is satisfied that the roll angle $\phi$ has been found with tolerable error. Then the roll angle $\phi$ is multiplied by the sign of the yaw rate $\dot{\psi}$, step 64, to give a minus or plus polarity to the roll angle and thus establish a direction of turn. Plus is right turn, minus a left turn.

Figure 6:
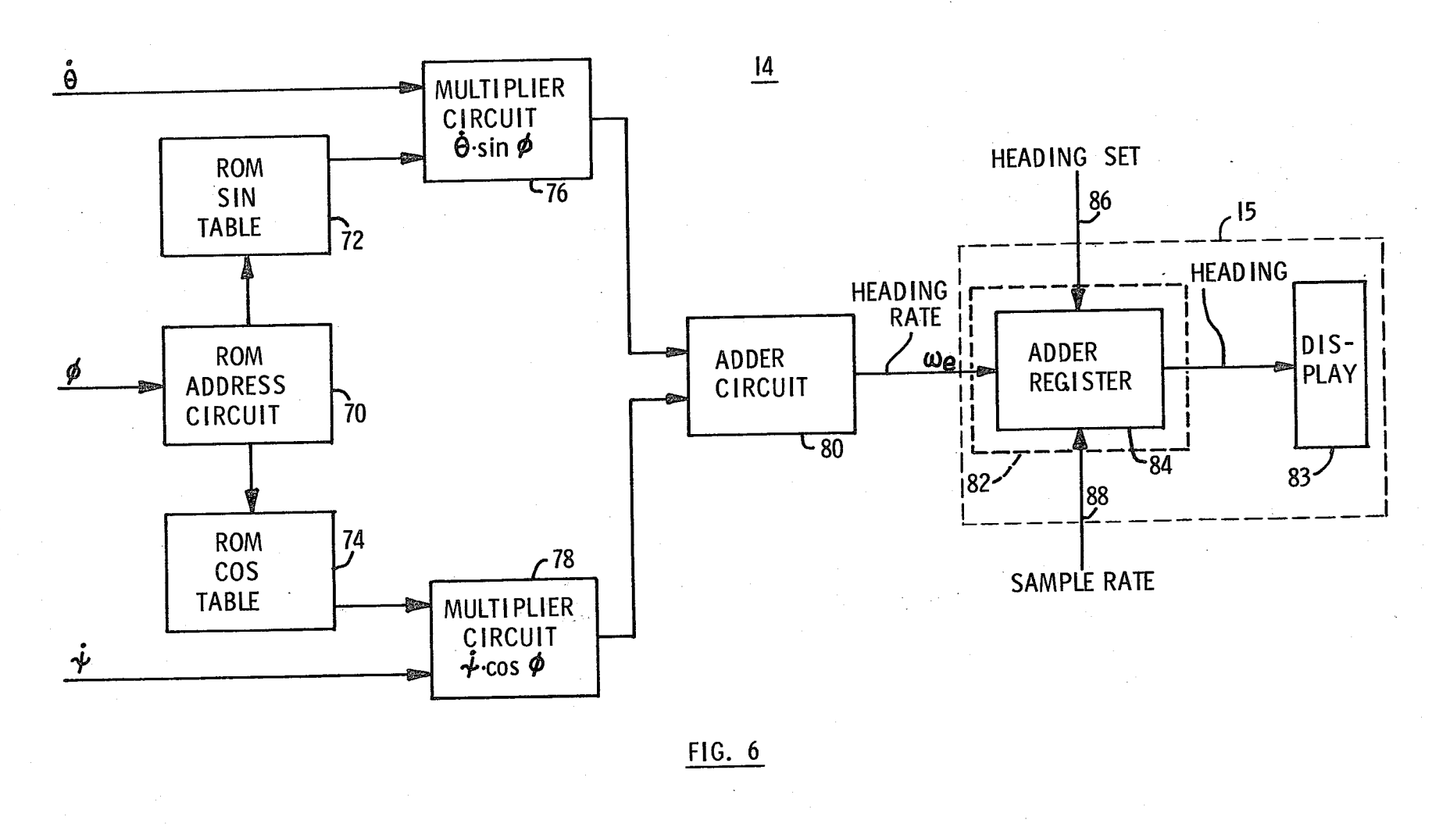
FIG. 6 is a block diagram of a yaw/pitch rate resolver circuit which may be used in the system of FIG. 1.

If at any time at the completion of step 54 it is found that the roll angle exceeds 0.99 radian or approximately 57°, the system exits immediately through step 64 because this approach gives less than desired accuracy above approximately 57° of roll or bank angle. If it is desirable to obtain the roll angle beyond approximately 57° with greater accuracy, the trigonometric functions may be retained instead of being replaced with the power series as in FIG. 6, resulting in the expression:

$$X = |\dot{\psi}| + \dot{\theta}\tan\phi - \frac{g}{v}\frac{\sin\phi}{(\cos\phi)^2} \qquad (7)$$

Figure 5:
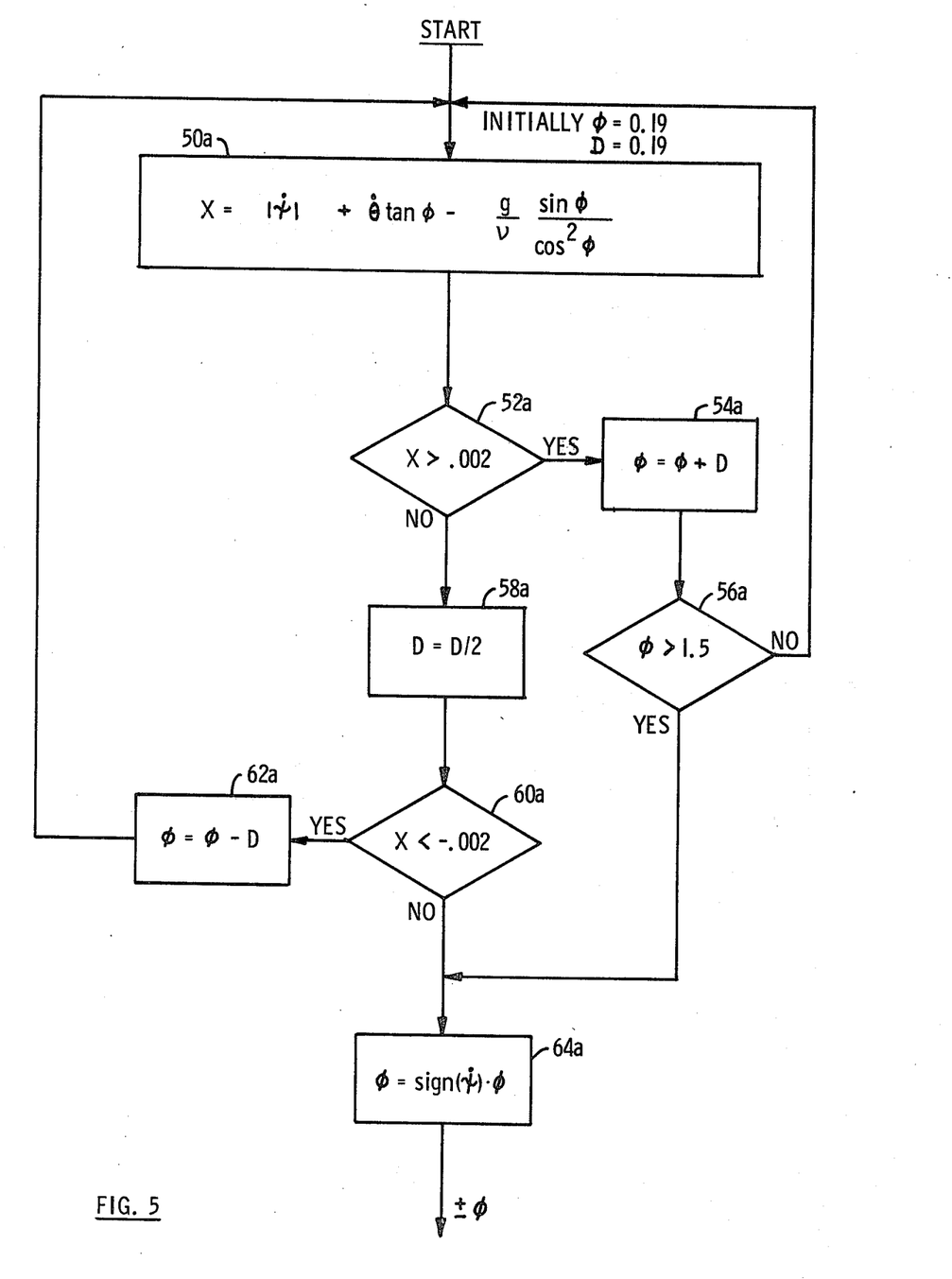
FIG. 5 is a diagram of another procedure which may be used in a microprocessor in the roll angle computer circuit of FIG. 1.

This may be implemented in the same way as shown in FIG. 5, with the same steps as shown in FIG. 4, with the exception that the inquiry of step 56 is now extended to 90° or 1.58 radians.

Yaw and pitch resolver circuit 14 includes ROM address circuit 70, ROM sin table 72, and ROM cosine table 74, FIG. 6, two multiplier circuits 76 and 78 and an adder circuit 80. The value of roll angle $\phi$ is submitted to ROM address circuit 70, which immediately locates the sin value in ROM sin table 72 and cos value in ROM cos table 74, and provides each of them respectively to one input of multiplier circuit 76 and 78. The other input to multiplier circuit 76 is pitch rate $\dot{\theta}$, and to multiplier circuit 78 is yaw rate $\dot{\psi}$. The outputs of multiplier circuits 76 and 78 are combined in adder circuit 80 to provide the heading rate $\omega_e$. Heading display 15 may include a heading rate integrator circuit 82 including an adder register 84, to receive the heading rate signal $\omega_e$ and accumulate it over time to produce the heading manifested in display 83. Adder register 84 is provided with an initial heading by heading set signal 86, which is then periodically updated by the heading rate $\omega_e$ in accordance with the sample rate 88.

Figure 7:
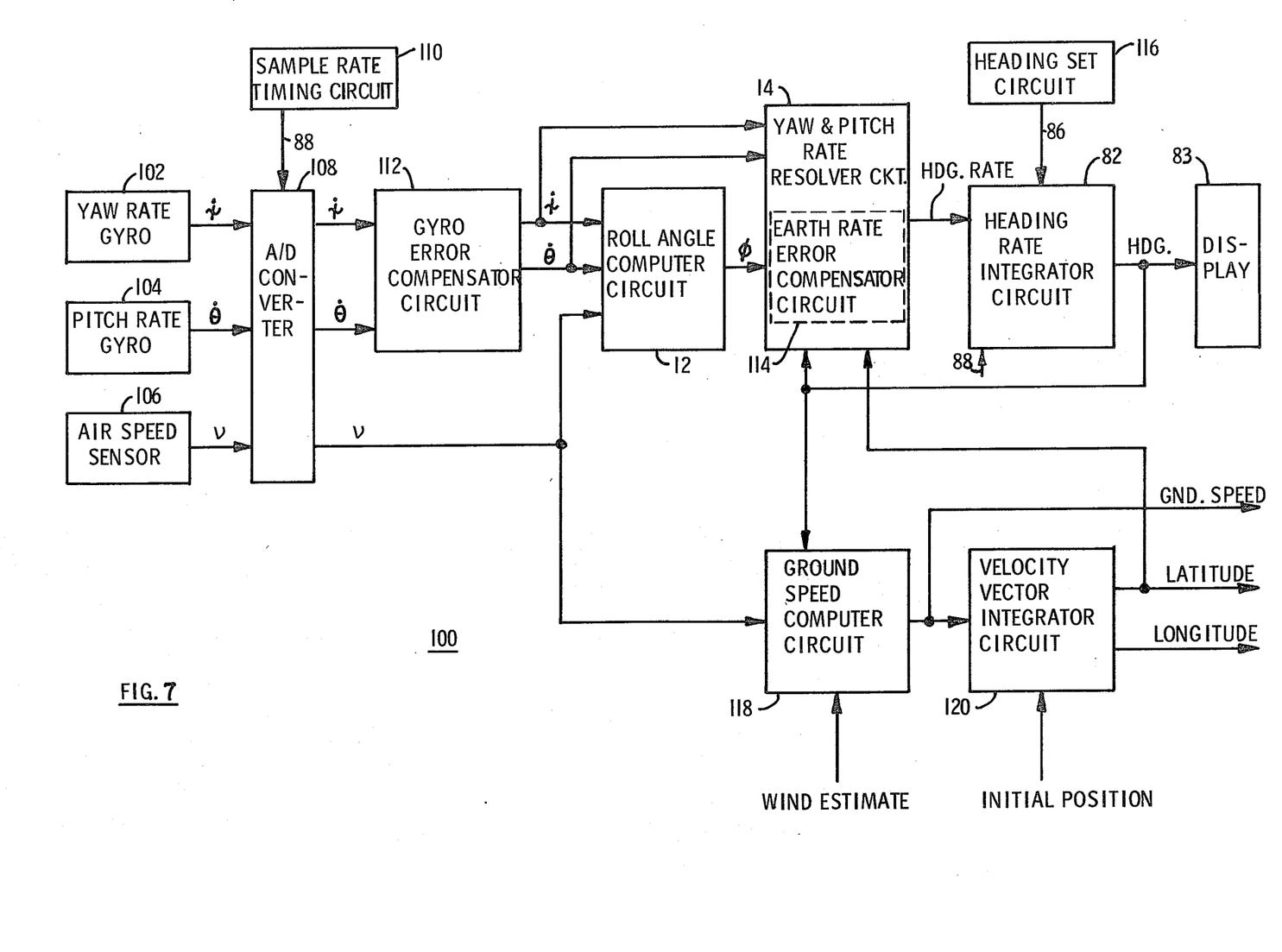
FIG. 7 is a more detailed block diagram of the system of FIG. 1 in a more comprehensive navigation system.

The heading reference system 10 according to this invention including roll angle computer circuit 12 and yaw and pitch rate resolver 14, may be typically employed in a navigation system 100, FIG. 7, which includes a yaw rate gyro or yaw rate integrated gyro 102 to provide the yaw rate input, and pitch rate gyro or pitch rate integrating gyro 104 to provide the pitch rate input, and an air speed sensor 106 to provide the air speed input. The three inputs are applied to an analog to digital converter 108 which is periodically sampled, for example 20 times a second, by sample rate timing circuit 110 to provide the digital output of the yaw rate and pitch rate to roll angle computer circuit 12 through gyro error compensator circuit 112, which is a standard procedure for compensating for drift rate, temperature and scale factor errors caused by mechanical tolerances in the gyro assembly. Yaw and pitch rate resolver circuit 14 may include an earth rate error compensator circuit 114 which removes the inertial earth rotation rate from the signals.

Typically the output of yaw and pitch rate resolver circuit 14, i.e. the heading rate $\omega_e$, is provided to heading rate integrator circuit 82 and display 83. The sample rate at which the initial heading information provided on line 86 is updated by the signals on line 88 is typically the same rate at which the A/D converter 108 is sampled, i.e. twenty times per second. The heading angle initialization on line 86 is typically provided by a heading set circuit 116, which may incorporate a flux gate magnetic sensor, located on the aircraft, or circuit 116 may be a receiver circuit for a radio navigation aid. Navigation system 100 may include a ground speed computer circuit 118 which combines the heading, air speed, and wind estimate to compute the ground speed. The ground speed may in turn be combined with initial position information in the velocity vector integrator circuit 120 to provide the present latitude and longitude of the craft.

Figure 8:
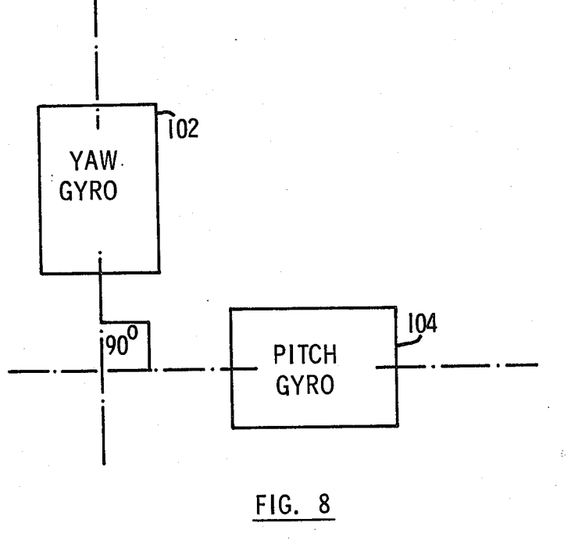
FIG. 8 is a schematic diagram showing the orientation of the two yaw and pitch gyros in a simple arrangement to provide yaw rate and pitch rate information.
Figure 9:
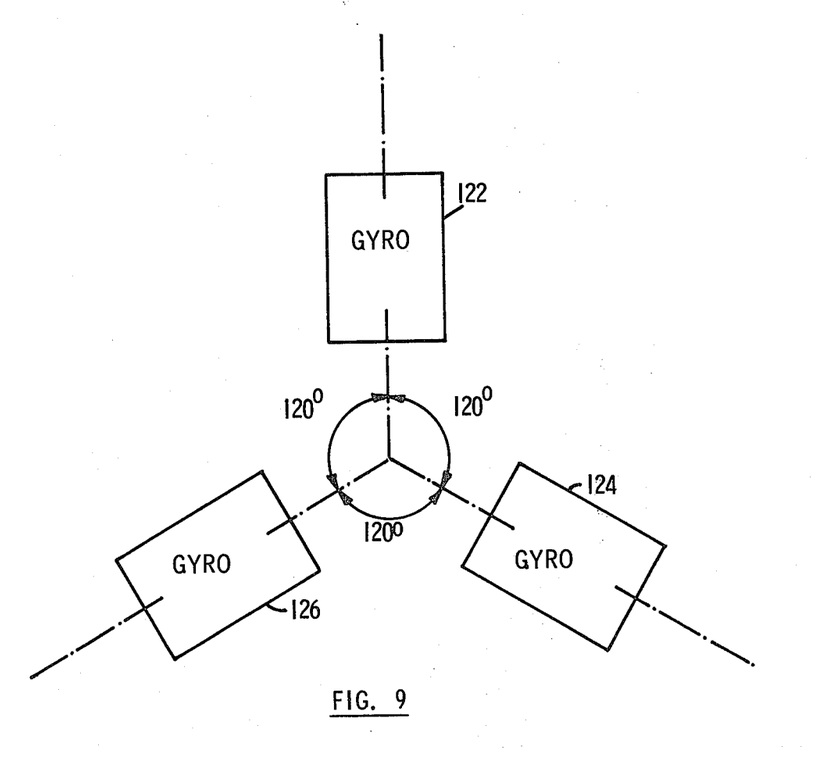
FIG. 9 is a schematic diagram of an arrangement showing three gyros arranged redundantly to provide increased reliability.

Typcially, the yaw rate gyro 102 and pitch rate gyro 104 are oriented at 90° to each other, as shown in FIG. 8. However, if redundancy is desired to improve reliability, three gyros 122, 124, 126, FIG. 9, may be arranged at 120° intervals so that upon the failure of any one gyro, either one of the others may be assumed to be either the pitch or the yaw gyro and in combination with the remaining operating gyro may be used to obtain the other quantity representing the pitch or yaw rate.

Other embodiments will occur to those skilled in the art and are within the following claims:

What is claimed is:

1. An aircraft heading reference system comprisng:
   means for sensing the yaw rate $\dot{\psi}$ of the aircraft and producing electrical signals representative thereof;
   means for sensing the pitch rate $\dot{\theta}$ of the aircraft and producing electrical signals representative thereof;
   means for sensing the air speed $v$ of the aircraft and producing electrical signals representative thereof;
   means, responsive to said electrical signals representative of said yaw rate, pitch rate, and air speed, for determining an electrical signal representative of the roll angle $\phi$ according to the expression:

$$\dot{\psi} + \dot{\theta}\tan\phi = (\tan\phi/\cos\phi)(g/v);$$

and means, responsive to said pitch rate $\dot{\theta}$, yaw rate $\dot{\psi}$, and roll angle $\phi$ electrical signals, for resolving said yaw and pitch rates about said roll angle for providing an electrical signal representative of the heading rate of the aircraft.

2. The reference system of claim 1 in which said means for sensing yaw rate and said means for sensing pitch rate each includes a single degree of freedom rate gyro.

3. The heading reference system of claim 1 in which said means for sensing yaw rate and said means for sensing pitch rate each includes a rate integrating gyro.

4. The heading reference system of claim 1 in which said means for determining includes a first divider circuit responsive to the acceleration of gravity as dividend and air speed as the divisor; a subtractor circuit for subtracting the pitch rate from the output of said first divider circuit; a second divider circuit responsive to the yaw rate as dividend and output from the subtractor circuit as divisor.

5. The heading reference system of claim 4 further comprising arc-tan calculating circuit including a squaring circuit and third divider circuit each responsive to the output from said second divider circuit, said third divider circuit having a divisor input of three; a multiplier circuit responsive to the outputs of said squaring circuit and third divider circuit and a second subtractor circuit for subtracting the output of said multiplier circuit from the output of said second divider circuit to obtain the roll angle.

6. The heading reference system of claim 1 in which said means for determining includes means for determination of the roll angle $\phi$ from the error expression:

$$X = \dot{\psi} + \dot{\theta}\phi\left(1 + \frac{\phi^2}{3}\right) - \frac{g}{v}\phi\left(1 + \frac{5}{6}\phi^2\right)$$

for roll angles no greater than approximately fifty-seven degrees.

7. The heading reference system of claim 1 in which said means for determining includes means for determination of the roll angle from the error expression:

$$X = |\dot{\psi}| + \dot{\theta}\tan\phi - (g/v)(\sin\phi/\cos^2\phi).$$

8. The heading reference system of claim 1 in which said means for resolving includes a ROM sin table and ROM cos table; a ROM addressing circuit responsive to the roll angle for reading out the respective values for the roll angle; a first multiplier circuit responsive to the ROM sin table readout and the pitch rate; a second multiplier circuit responsive to the ROM cos table readout and the yaw rate; and an adder circuit responsive to the output of said first and second multiplier circuits for producing the heading rate of the aircraft.

9. The heading reference system of claim 1, further including means for integrating said signal representations of heading rate to provide the instantaneous heading angle.

10. The heading reference system of claim 9, further including display means responsive to said means for integrating for manifesting the instantaneous heading.

11. The heading reference system of claim 9, further including means for computing and manifesting the latitude and longitude of the aircraft.

* * * * *